United States Patent [19]

Miller

[11] Patent Number: 4,802,991

[45] Date of Patent: Feb. 7, 1989

[54] METHOD AND APPARATUS FOR WATER PURIFICATION

[75] Inventor: George Miller, Bogota, Colombia

[73] Assignee: Hidrotronic Watercleaning Systems, Ltd., Switzerland

[21] Appl. No.: 656,866

[22] Filed: Oct. 2, 1984

[30] Foreign Application Priority Data

Oct. 6, 1983 [DE] Fed. Rep. of Germany ....... 3336460

[51] Int. Cl.$^4$ .............................. C02F 1/46; C02F 1/52
[52] U.S. Cl. .................................... 210/705; 204/149; 204/273; 204/275; 210/709; 210/717; 210/748; 210/96.1; 210/192; 210/221.2
[58] Field of Search ................................ 210/661–663, 210/665, 667–669, 673, 703, 709, 745, 748, 799, 800, 804, 806, 807, 94, 95, 96.1, 243, 259, 262, 265, 266, 274, 299, 705, 717, 192, 221.2; 204/149, 273, 275

[56] References Cited

U.S. PATENT DOCUMENTS

| | | | |
|---|---|---|---|
| 3,036,713 | 5/1962 | Lambeth | 210/800 |
| 3,623,606 | 11/1971 | Turnidge | 210/94 |
| 3,915,820 | 10/1975 | Ito et al. | 210/748 |
| 3,925,202 | 12/1975 | Hirs | 210/274 |
| 4,101,563 | 7/1978 | Landis | 210/748 |
| 4,294,697 | 10/1981 | Sawa et al. | 210/243 |
| 4,350,590 | 9/1982 | Robinson | 210/243 |

Primary Examiner—Ivars Cintins
Attorney, Agent, or Firm—Cohen, Pontani & Lieberman

[57] ABSTRACT

A method and apparatus for water purification, wherein ions are released from electrodes during electrolysis and combine with impurities to form a floc which, in turn, absorbs other impurities. A moving bed of solid, non-conductive particles surrounding the electrodes is also provided to insure self-cleaning of the electrodes. The apparatus for carrying out the process comprises an electrolysis chamber containing a moving bed of solid particles surrounding the electrodes, an inlet conduit for contaminated water at one end of the chamber, and a conically extending flocculation basin at the opposite end of the chamber. The invention simplifies water purification processes and apparatus.

21 Claims, 1 Drawing Sheet

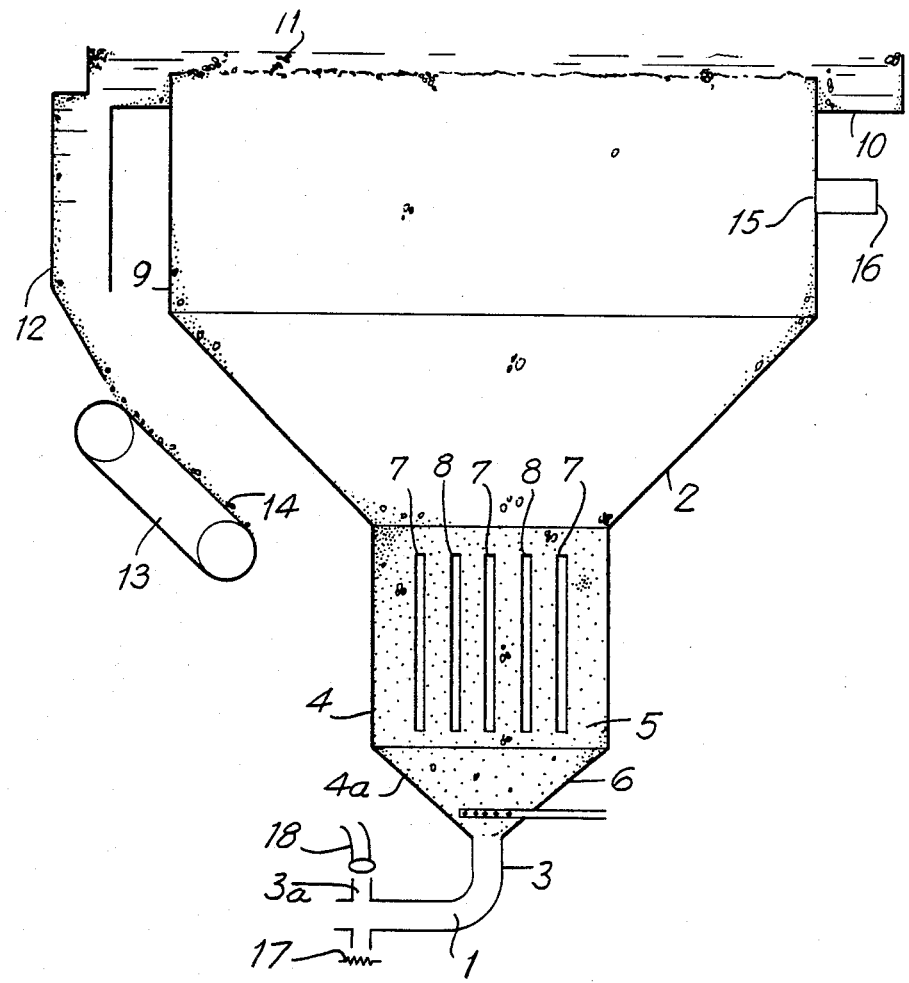

METHOD AND APPARATUS FOR WATER PURIFICATION

BACKGROUND OF THE INVENTION

This invention relates to a process for water purification and to an apparatus for carrying out the process.

It is an object of this invention to provide a process of the above art that is particularly suitable for purifying waste water containing fatty acids.

In broad terms, the invention provides, in one aspect thereof, a water purification process wherein water to be purified is directed past at least two electrodes of different polarity and made of bivalent or trivalent metals. The electrodes are surrounded with a moving bed formed of solid, non-conductive particles whose specific density is greater than that of the contaminated water.

According to the process of the invention, bivalent or trivalent metal ions are released from electrolysis. The ions cause flocculation in the water to be purified. It is assumed that the floc is formed through the build-up of colloidal hydrated oxides of the separated metal ions. The floc, in turn, binds or absorbs, other impurities present in the contaminated water and thus serves as a transport medium to remove the impurities from water. The continuous production of ions for flocculation purposes is possible due to the self cleaning of the electrodes by the solid particles of the moving bed. The solid particles are kept in motion by water flowing therethrough, subject to bed characteristics.

The particles are moved at various speed in various directions against and along the surfaces of the electrodes to insure cleaning of those electrodes. An additional electrode cleaning effect results from the return motion of those solid particles which have been carried along with water and which move past the electrodes on their downward movement.

The electrodes are comprised of bivalent or trivalent metals, preferably iron or aluminum or of alloys of such metals.

In a preferred embodiment of the process of the invention, at least three electrodes are provided. The polarity of the electrodes is alternated by applying a direct current voltage. Advantageously, the polarity of each individual electrode is changed periodically, e.g. every 10 minutes, so that all the electrodes, not only those permanently positively charged, are consumed uniformly, and the above-described electrode-cleaning action takes place simultaneously.

The process of the invention is particularly suitable for purifying water containing fatty acids. Here, ions released during electrolysis combine with the fatty acids to form hydrophobic floc of metallic soap. The floc, in turn, binds or absorbs other impurities, particularly organic colloidal particles, and carries them along.

The contaminated water can be directed through the moving bed by pressure. It is also possible to blow air into the bed to intensify its motion. It is most preferred that the contaminated water be directed through the moving bed in a generally vertically upward direction.

When the electrodes are connected to a power supply, such as a direct current voltage source, the intensity of the purification process can be controlled, especially when electrodes of the same material are used, by varying the voltage of the electrodes as a function of the degree of pollution of the water to be purified. This results in energy being saved when the inflowing water is relatively clean.

Accordingly to another feature of the method of the present invention, the purification process includes the step of optically determining the degree of pollution of the water to be purified by measuring or sensing the turbidity of that water.

In another broad aspect of the present invention, apparatus is provided for purifying water. The apparatus comprises an electrolysis chamber containing a moving bed which surrounds at least two electrodes and which is composed of solid, non-conductive particles having specific density greater than that of the water to be purified. A water inlet conduit is provided at one end of the chamber, and a conically extending flocculation basin is located at the opposite end of the chamber.

Since the electrodes are located in a moving bed comprised of solid particles, the above-described self-cleaning of the electrodes is done in a simple way, and the continuity and high efficiency of the cleaning is ensured. The flow through the apparatus is slowed in the flocculation basin due to its conical shape, which also allows the solid particles carried away from the bed to return to the electrolysis chamber.

In a preferred embodiment, the electrodes are made of different metals. This results in an energy-saving arrangement. The ion release in the electrolytic process can also be accomplished without applying an external power source if the electrodes are made of suitable dissimilar metals. In case of strongly corrosive water, the electrodes can even constitute a battery cell and generate electric current.

The moving bed surrounding the electrodes can be of various kinds, especially with regard to the motion of the solid particles in the bed. In particular, the bed may be a fluidized bed, an idle bed, a loose bed, a parallel-flow bed, or a high-speed flow bed. The characteristics of the bed depend to a large degree on the properties of the solid particles, e.g. granite, sand or plastic granules as well as the number, size and arrangement of the electrodes. Granite particles are particularly suitable as a moving bed of solid, non-conductive particles.

In accordance with a further feature of this invention, a monitoring device is provided to sense the degree of pollution of the water that is to be cleansed. This allows for an economical, simple control of the electrolytic process when the electrodes are energized from an outside source. The effectiveness of the purification of highly contaminated water can thus be increased and energy can be saved when relatively clean water is processed. The monitoring device preferably includes a light source and a light sensor reacting to variations in water turbidity.

The casing of the electrolysis chamber preferably is always negatively charged when the purification process is carried out; otherwise, the casing would corrode due to polarity reversal. The casing of the electrolysis chamber may be made, for instance, of steel.

In accordance with another feature of the present invention, a discharge conduit for purified water is installed at a distance from the upper rim of the flocculation basin.

BRIEF DESCRIPTION OF THE DRAWING

The sole figure in the drawing illustrates a preferred water purification apparatus and process in accordance with the present invention.

DETAILED DESCRIPTION OF THE PREFERRED EMBODIMENTS

Contaminated water flows through an inlet conduit 3 upwards into an electrolysis chamber 4. An upwardly conically widening flocculation basin 2, having a cylindrical upper part 9, is connected to the top of electrolysis chamber 4.

The electrolysis chamber 4 contains a bed 5 comprised of solid particles. A lower part 4a of the chamber 4 enlarges conically upwardly from the inlet conduit 3, and an air blower 6 is mounted in that conical lower part 4a. Electrodes 7 and 8 are immersed in the bed 5 in the cylindrical part of the electrolysis chamber 4. The electrodes are mounted in chamber 4 in any suitable way (not shown in the drawing) and, in use, are connected to a suitable power source.

An annular channel 10, open at its top, is provided on the upper cylindrical part 9 of the flocculation basin 2. The channel 10 is designed to receive foam 11 rising to the surface. The channel 10 is connected to a discharge channel 12 having a textile fabric filter 13. The hydrophobic (water repellant) matter 14 separated on the filter 13 is further carried away in a manner not shown in the drawing.

A clean-water discharge conduit 16 is connected to the cylindrical part of the flocculation basin 2, below the annular channel 10.

A light source 17 is installed on one side of the inlet conduit 3 upstream of its connection to the electrolysis chamber 4, and a light sensor 18 is arranged on the other side of the conduit 3. Both the light source 17 and the sensor 18 are installed on a transparent portion 3a of the conduit 3. The light sensor controls the power supply to the electrodes (when the electrodes are energized) depending on the stimulation of the sensor.

The purification procedure, in particular waste water purification with the use of this apparatus, is as follows:

Contaminated water 1 flows through the inlet conduit 3 to the electrolysis chamber 4. When water passes the transparent section 3a, the light sensor 18 determines the degree of water contamination based on the turbidity of the water and correspondingly adjusts the power supply to the electrodes 7 and 8. When water enters the electrolysis chamber, its velocity assumes a value of the same order as the velocity of the solid particles of the bed 5. This velocity is about ten per cent of the free-falling velocity of those solid particles in water. Moreover, air is blown through the blower 6 into the electrolysis chamber 4, below the electrodes 7 and 8. This intensifies the motion in the electrolysis chamber.

The electrodes, which are preferably made of aluminum or iron, release ions which combine with impurities, in particular fatty acids, to form hydrophobic floc, for example metallic soaps. The floc, in turn, absorbs other impurities, particularly organic colloidal particles and carries them along. When the mixture leaves the electrolysis chamber 4 its flow velocity becomes substantially reduced due to the conical enlargement of the flocculation basin 2. This further promotes the binding of other impurities with the electrolysis floc. The solid particles, which are carried off from the bed 5, return by gravity into the electrolysis chamber 4 due to their higher specific density, whereupon they pass by the electrodes and clean them again.

The flocculated impurities form a foam layer 11 on the surface of the flocculation chamber. The layer 11 overflows into the annular channel 10 from where it passes through the discharge channel 12 and over the fabric filter 13. Hydrophobic matter 14 is separated on the filter and removed in a way not described herein.

Purified water 15 is removed through the discharge conduit 16 from the flocculation basin 2 and may be further purified in sand filter, not shown in the drawing.

The efficiency of the electrodes 7 and 8, i.e. the continuous release of ions to form the floc is ensured by the solid bed particles 5. The particles move within the electrolysis chamber towards and along the electrodes under the influence of the water and air flow, and also move back from the flocculation basin to the chamber after being carried off from the bed. The electrode-cleaning mechanism is thus obtained not only when strongly contaminated waste water is purified but also when relatively clean raw water is handled. Due to the cleaning action, a thin film of oxides is removed from the electrodes, which would otherwise coat the electrodes and hinder the ion release.

The light source 17 and the light sensor 18, which is located opposite the light source, are adapted to measure or sense the degree of contamination of the water based on its turbidity, i.e. the reduction in the transmission of light through the water. The sensor 18 controls correspondingly the power supply to the electrodes and thus the intensity of electrolysis.

Electrodes made of dissimilar materials can be employed in chamber 4 without departing from the scope of this invention. Such electrodes can release ions without being energized from an outside source. Indeed electrolysis chamber 4 may become a battery when strongly corrosive water is purified, especially when aluminum anodes are used in the electrolysis chamber.

What is claimed is:

1. A water purification process comprising:
   directing water to be purified into an electrolysis chamber having at least two electrodes having voltages of different polarity and made of multi-valent metals, the electrodes being surrounded with a moving bed of solid, non-conductive particles whose specific density is greater than that of the contaminated water;
   passing the contaminated water through the moving bed and past the at least two electrodes in a generally vertically upward direction to form hydrophobic floc;
   directing the floc, water and a portion of the solid particles from the electrolysis chamber to a flocculation chamber directly connected to an upper end of the electrolysis chamber;
   returning the solid particles from the flocculation chamber to the electrolysis chamber past the at least two electrodes in a generally vertically downward direction to clean the electrodes.

2. A water purification process according to claim 1 wherein the multi-valent metals are iron or aluminum.

3. A process according to claim 1 wherein at least three electrodes are provided, the polarity of the electrodes being alternated by applying a direct current voltage.

4. A process according to claim 1, wherein the polarity of each individual electrode is changed periodically.

5. A process according to claim 1, wherein the contaminated water is directed through the moving bed by pressure.

6. A process according to claim 1 wherein air is blown into the bed to intensify its motion.

7. A process according to claim 1 wherein the voltage of the electrodes is controlled as a function of the degree of pollution of the water to be purified.

8. A process according to claim 1 including the step of optically determining the degree of pollution of the water to be purified by measuring the turbidity thereof.

9. A process according to claim 1 wherein the solid non-conductive particles are granite particles.

10. A process according to claim 1 wherein the water to be purified contains fatty acids.

11. Apparatus for purifying fatty acid containing waste water by continuous flocculation with bivalent or trivalent metal ions released during electrolysis using electrodes which are continuously cleaned by a moving bed of solid non-conductive particles having a specific density greater than that of the waste water to be purified, said apparatus comprising:
   a. an electrolysis chamber including at least two electrodes, the electrodes being constructed from a bivalent or trivalent metal which bivalent or trivalent metal is released during electrolysis to cause flocculation, said electrolysis chamber having an open upper end, a lower end and a cross-sectional area;
   b. a water inlet connected to the lower end of said electrolysis chamber for directing the waste water up through the electrolysis chamber; and
   c. a conically extending flocculation basin having a lower opening, an upper opening and a varying cross-sectional area which increases from the lower opening to the upper opening of said basin, the lower opening of said flocculation basin being operatively connected to the open upper end of said electrolysis chamber, and wherein the cross-sectional area of said electrolysis chamber and the varying cross-sectional area of said flocculation basin are selected to permit water flowing upwardly from said electrolysis chamber into said flocculation basin to have a velocity in said electrolysis chamber of about 10% of the free-falling velocity of the solid non-conductive particles in water which is sufficient to cause and sustain movement of the solid non-conductive particles for continuously cleaning the electrodes in said electrolysis chamber, and to have a decreasing velocity as the water rises through said flocculation basin which decreasing velocity is insufficient to sustain movement of the solid non-conductive particles, whereby solid non-conductive particles carried up out of the electrolysis chamber into the flocculation basin by the upward flow of water will fall back into the electrolysis chamber.

12. Apparatus according to claim 11 wherein the electrodes are made of aluminum.

13. Apparatus according to claim 11 wherein the electrodes are made of iron.

14. Apparatus according to claim 11 wherein the electrodes are made of different metals.

15. Apparatus according to claim 1 wherein the moving bed is a fluidized bed, idle bed, loose bed, parallel-flow bed or a high-speed flow bed.

16. Apparatus according to claim 11 comprising an air blower connected to the electrolysis chamber to blow air to a lower, region thereof.

17. Apparatus according to claim 11 wherein the flocculation basin includes an annular channel extending around an upper rim of the flocculation basin, and an outlet conduit for discharging flocculated matter therefrom.

18. Apparatus according to claim 17, further comprising a discharge conduit connected to the flocculation basin at a distance from the upper rim thereof for discharging cleansed water from the flocculation basin.

19. Apparatus according to claim 11 further comprising water contamination monitoring means provided at the inlet conduit for sensing the contamination of the water conducted therethrough, and connected to an electrode voltage control unit.

20. Apparatus according to claim 11 wherein the monitoring device includes a light source and a light sensor reacting to variations in the turbidity of water conducted through the inlet conduit.

21. Apparatus according to claim 11, wherein the inlet conduit is positioned at the bottom of the electrolysis chamber, and the flocculation basin is positioned at the upper end of the chamber.

* * * * *